US006853748B2

(12) United States Patent
Endo et al.

(10) Patent No.: US 6,853,748 B2
(45) Date of Patent: Feb. 8, 2005

(54) SIGNAL PROCESSING APPARATUS AND METHOD FOR REDUCING GENERATION OF FALSE COLOR BY ADAPTIVE LUMINANCE INTERPOLATION

(75) Inventors: Toshiaki Endo, Kanagawa (JP); Eiichiro Ikeda, Kanagawa (JP); Takaaki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 09/853,536

(22) Filed: May 11, 2001

(65) Prior Publication Data

US 2002/0025069 A1 Feb. 28, 2002

(30) Foreign Application Priority Data

May 12, 2000 (JP) ........................................ 2000-140809

(51) Int. Cl.$^7$ ................................................. G06K 9/00
(52) U.S. Cl. ........................ 382/167; 382/300; 348/273
(58) Field of Search ................................. 382/162, 167, 382/254, 261, 266, 268, 274, 275, 300–301; 358/1.9, 518, 520, 525, 447, 463; 348/222.1, 239, 234, 242, 237, 241, 272, 273, 277, 663, 675, 666, 253

(56) References Cited

U.S. PATENT DOCUMENTS

| | | | | |
|---|---|---|---|---|
| 5,202,756 A | * | 4/1993 | Sasaki et al. | ............. 348/223.1 |
| 5,325,182 A | * | 6/1994 | Murata et al. | ............... 348/663 |
| 5,333,055 A | * | 7/1994 | Murata et al. | ............... 348/239 |
| 5,382,976 A | * | 1/1995 | Hibbard | ...................... 348/273 |
| 5,541,648 A | * | 7/1996 | Udagawa et al. | ........ 348/222.1 |
| 5,555,023 A | * | 9/1996 | Maenaka et al. | ........... 348/253 |
| 5,737,017 A | | 4/1998 | Udagawa et al. | ........... 348/280 |
| 6,611,287 B1 | * | 8/2003 | Yamamoto et al. | ...... 348/222.1 |

FOREIGN PATENT DOCUMENTS

| | | | |
|---|---|---|---|
| JP | 2-142293 | 5/1990 | ............ H04N/9/07 |
| JP | 6-205422 | 7/1994 | ............ H04N/9/07 |
| JP | 7-203465 | 8/1995 | ............ H04N/9/07 |
| JP | 9-200782 | 7/1997 | ............ H04N/9/07 |
| JP | 11-215513 | 8/1999 | ............ H04N/9/07 |
| JP | 11-220751 | 8/1999 | ............ H04N/9/07 |
| JP | 2000-050292 | 2/2000 | ............ H04N/9/07 |
| JP | 2001-320720 | 11/2001 | ............ H04N/9/07 |

* cited by examiner

*Primary Examiner*—Leo Boudreau
*Assistant Examiner*—Ishrat Sherali
(74) *Attorney, Agent, or Firm*—Morgan & Finnegan, LLP

(57) ABSTRACT

Adaptive luminance interpolation processing in a signal processing apparatus for acquiring an image signal from an image sensing element having color filters and processing the image signal is described. An adaptive luminance interpolation circuit determines the correlation of the image signal in the vertical and horizontal directions, and interpolates the luminance signal of the image signal in a direction in which the correlation is higher. The chroma signal of the image signal is interpolated regardless of the correlation direction. The chroma signal is processed by a color conversion matrix circuit for performing signal processing of suppressing a false color in the vertical direction or a color conversion matrix circuit for performing signal processing of suppressing a false color in the horizontal direction, switched by a matrix switching circuit based on the interpolation direction.

17 Claims, 8 Drawing Sheets

FIG. 2

| P1<br>(R) | P2<br>(G1) | P3<br>(R) |
|---|---|---|
| P4<br>(G2) | P5<br>(B) | P6<br>(G2) |
| P7<br>(R) | P8<br>(G1) | P9<br>(R) |

FIG. 4

| R | G1 | R | G1 |
|---|----|---|----|
| G2 | B | G2 | B |
| R | G1 | R | G1 |
| G2 | B | G2 | B |

RED — BLUE

| R  | G1 | R  | G1 |
|----|----|----|----|
| G2 | B  | G2 | B  |
| R  | G1 | R  | G1 |
| G2 | B  | G2 | B  |

SIGNAL PROCESSING APPARATUS AND METHOD FOR REDUCING GENERATION OF FALSE COLOR BY ADAPTIVE LUMINANCE INTERPOLATION

FIELD OF THE INVENTION

The present invention relates to a signal processing apparatus and method and, more particularly, to a signal processing apparatus and method for reducing generation of a false color in adaptive luminance interpolation.

BACKGROUND OF THE INVENTION

FIG. 3 is a block diagram showing the arrangement of a conventional single-CCD digital camera, and especially shows a signal processor in detail.

A signal from a CCD image sensing element 501 is adjusted in white gain by a WB (White Balance) circuit 502, and sent to a luminance notch circuit 510. The luminance notch circuit 510 reduces the gain of color signal components near the Nyquist frequency in the vertical direction by using a VLPF (Vertical Low-Pass Filter), and also reduces the gain in the horizontal direction by using an HLPF (Horizontal Low-Pass Filter). These filters are called luminance notch filters. Then, an HBPF (Horizontal BandPass Filter) circuit 511 and VBPF (Vertical BandPass Filter) circuit 514 shift up frequency components slightly lower than the Nyquist frequency decreased by the notch filters.

PP (aperture Peak) gain circuits 512 and 515 adjust the amplitude in both the horizontal and vertical directions, and BC (Base Clip) circuits 513 and 516 cut small-amplitude components and remove noise. An adder 517 adds the horizontal and vertical components, an APC (APerture Control) main gain circuit 518 applies a main gain to the resultant signal, and an adder 519 adds a baseband signal to the signal. A γ conversion circuit 520 γ-converts the signal, and a luminance correction (YCOMP) circuit 521 corrects the luminance signal level by color.

Assume that an output from an image sensing element having filters of a checkered Bayer layout as shown in FIG. 4 is processed. In particular, primary color filters achieve good color separation. Therefore, as shown in FIG. 5A, the notch filter method cannot absorb gain differences between different color filters by using only LPFs at the edge of an image having opposite hues, e.g., red and blue in left and right halves. The edge staircases or becomes jaggy, which degrades the image quality of a playback image. This will be explained with reference to FIG. 5B.

FIG. 5B is a view for explaining an output level from each pixel of the image sensing element. In FIG. 5B, a pixel outputting a relatively large value is blank, and a pixel having an output of almost 0 is hatched for descriptive convenience. Signal level differences between different color filters are large at an edge between opposite hues, and appear as jaggies. Further, the jaggies are enhanced by edge enhancement which is performed to increase the resolution (MTF: Modulation Transfer Function) which has been decreased by LPFs.

To prevent jaggies, the following adaptive interpolation luminance signal generation method has been proposed. The correlation between signals of upper, lower, right, and left pixels of the pixel to be interpolated is detected to determine based on the correlation whether this pixel corresponds to a vertical or horizontal stripe. Interpolation is performed using signals of upper and lower pixels for a vertical stripe, and using signals of right and left pixels for a horizontal stripe, thereby preventing jaggies of a luminance signal.

The adaptive interpolation luminance signal generation method will be described with reference to the flow chart of FIG. 8.

A green signal is interpolated first. For example, in the image shown in FIG. 6A, to interpolate pixels P1 to P9 (each parenthesized character represents a chroma signal obtained from the pixel, and corresponds to the color of the filters), a green signal at the pixel P5 (P5(G)) is interpolated as follows.

1. The absolute values (HDiff and VDiff) of the differences between upper and lower pixels of the pixel to be interpolated and between right and left pixels of the pixel to be interpolated are calculated by equation (1) (step S101):

$$HDiff=|P4(G)-P6(G)|, VDiff=|P2(G)-P8(G)| \quad (1)$$

2. The interpolation method is changed based on the calculated absolute values (step S102).

If VDiff<HDiff, the green signal P5(G) is interpolated using signals of adjoining pixels in the vertical direction by equation (2) (step S103):

$$P5(G)=(P2(G)+P8(G))/2 \quad (2)$$

If VDiff>HDiff, the green signal P5(G) is interpolated using signals of adjoining pixels in the horizontal direction by equation (3) (step S104):

$$P5(G)=(P4(G)+P6(G))/2 \quad (3)$$

Green signals are interpolated in this way for pixels which output signals other than green signals. Thereafter, red and blue signals are interpolated. Red signals are calculated by $$P2(R)=((P1(R)-P1(G))+(P3(R)-P3(G)))/2+P2(G)$$

$$P4(R)=((P1(R)-P1(G))+(P7(R)-P7(G)))/2+P4(G)$$

$$P5(R)=((P1(R)-P1(G))+(P3(R)-P3(G))+(P7(R)-P7(G))+(P9(R)-P9(G)))/4+P5(G) \quad (4)$$

Blue signals can also be obtained by the same calculation. Accordingly, signals of three, R, G, and B colors can be attained for each pixel. Further, a luminance signal Y is calculated by $$Y=0.3\times R+0.59\times G+0.11\times B \quad (5)$$

On the other hand, a color interpolation circuit 503 interpolates a chroma signal so as to give all color pixel values to all pixels (step S105). A color conversion MTX (MaTriX) circuit 504 converts the R, G, and B signals to the chroma signal. A CSUP (Chroma SUPpress) circuit 505 suppresses the chroma gain in low and high luminance regions, and a CLPF (Chroma Low-Pass Filter) circuit 506 limits the band of the chroma signals. A γ conversion circuit 507 converts the band-limited chroma signal into R, G, and B signals and at the same time γ-converts the R, G, and B signals. The γ-converted R, G, and B signals are converted into a color difference signal again. A C gain knee (Chroma gain knee) circuit 508 adjusts the chroma gain of the color difference signal, and an LCMTX (Linear Clip MaTriX) circuit 509 corrects the hue. The resultant signal is output together with the luminance signal.

Matrix operation by the color conversion MTX circuit 504 satisfies conditions that no false color is generated in the vertical direction when an image of an achromatic object is sensed.

However, in matrix operation performed by the color conversion MTX circuit 504, a false color is readily generated at a high frequency around the Nyquist frequency.

SUMMARY OF THE INVENTION

The present invention has been made in consideration of the above situation, and has as its object to easily reduce a false color to be generated as chroma signals of a high-frequency image and form a higher-quality image.

It is another object of the present invention to adjust the tendency of a false color to be appeared in the vertical and horizontal directions thereby flexibly adjusting the degree of the false color without decreasing the resolution upon a change in the characteristics of an optical LPF.

According to the present invention, the foregoing object is attained by providing a signal processing apparatus for acquiring an image signal from an image sensing element having color filters and processing the image signal, comprising: correlation operation means for determining correlation of the image signal in vertical and horizontal directions; first interpolation means for interpolating a chroma signal of the image signal; first signal processing means for performing signal processing of suppressing a false color in the vertical direction using a first matrix operation; second signal processing means for performing signal processing of suppressing a false color in the horizontal direction using a second matrix operation; and selection means for selecting said first or second signal processing means on the basis of the correlation obtained by said correlation operation means, wherein the chroma signal interpolated by said first interpolation means is processed by said first or second signal processing means selected by said selection means.

According to the present invention, the foregoing object is also attained by providing a signal processing method of acquiring an image signal from an image sensing element having color filters and processing the image signal, comprising: a correlation operation step of determining correlation of the image signal in vertical and horizontal directions; a first interpolation step of interpolating a chroma signal of the image signal; a selection step of selecting either of the vertical and horizontal directions on the basis of the correlation obtained in said correlation operation step; and a signal processing step of performing signal processing of suppressing a false color in the vertical or horizontal direction selected in said selection step for the chroma signal interpolated in the first interpolation step by performing matrix operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 2 is a view for explaining an interpolation method according to the embodiment of the present invention;

FIG. 4 is a view showing a filter layout;

DETAILED DESCRIPTION OF THE PREFERRED EMBODIMENT

A preferred embodiment of the present invention will be described in detail in accordance with the accompanying drawings.

Figure 1:
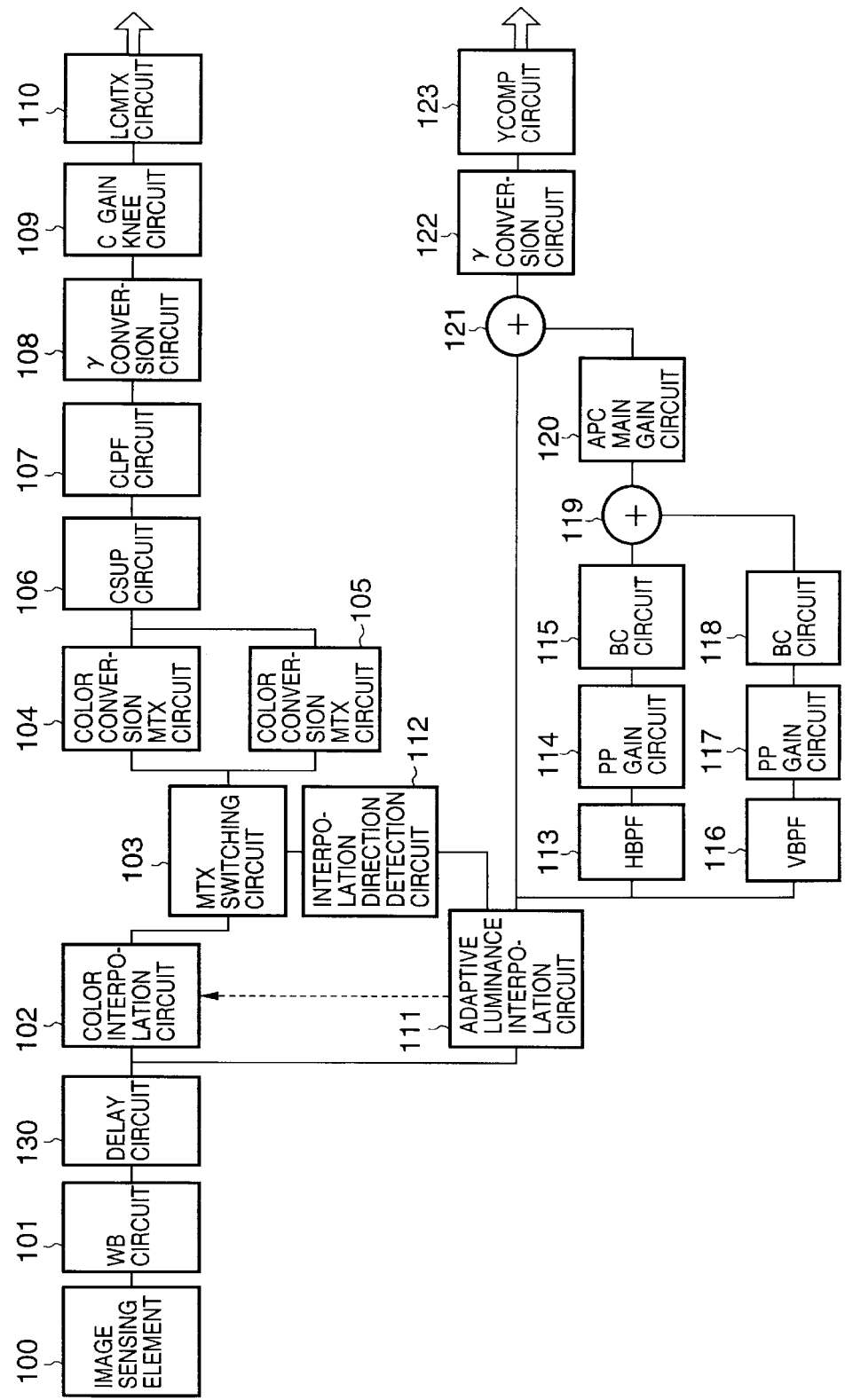
FIG. 1 is a block diagram showing the arrangement of a signal processing unit according to an embodiment of the present invention.
Figure 3:
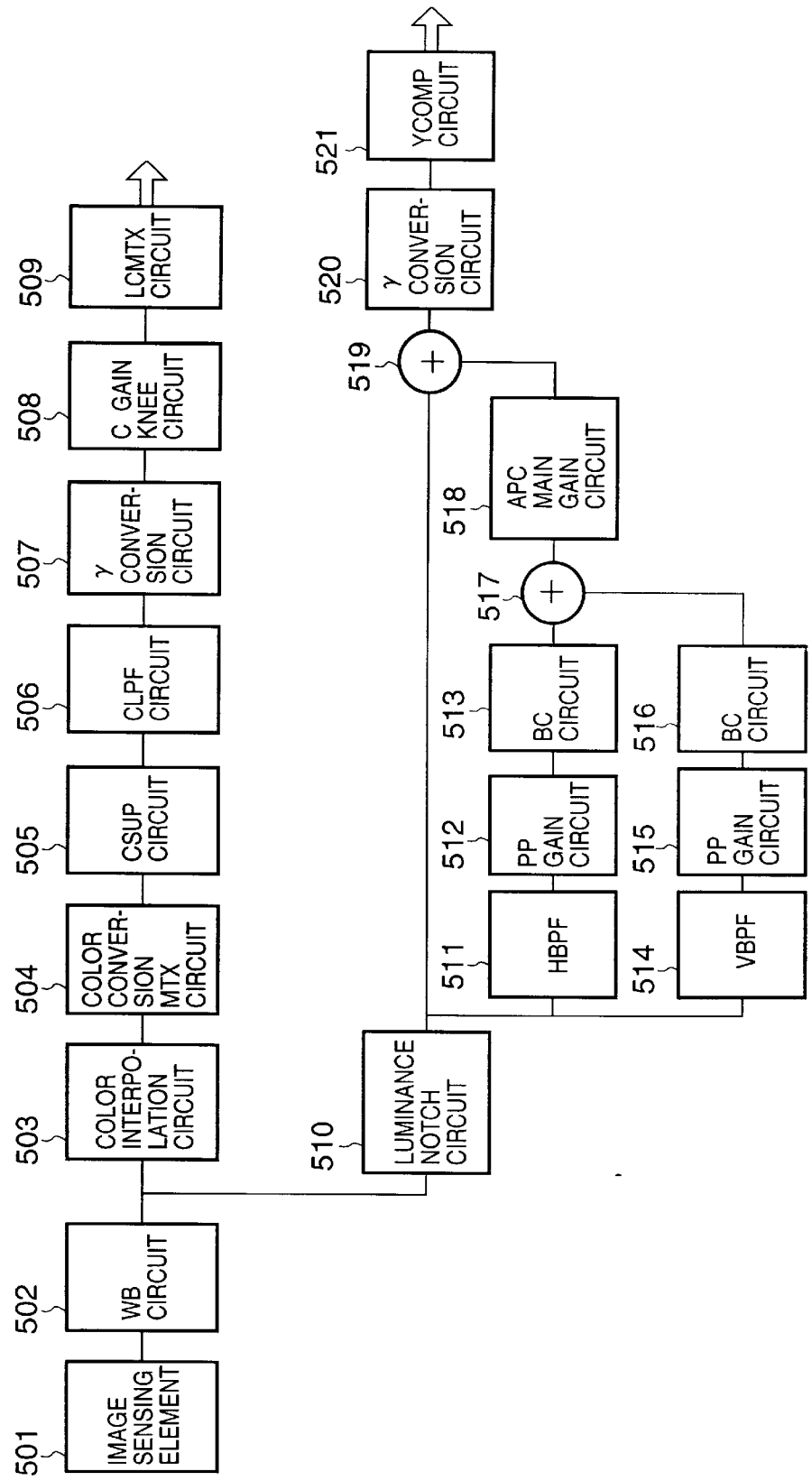
FIG. 3 is a block diagram showing the arrangement of a signal processing unit of a conventional digital camera.
Figures 5A, 5B:
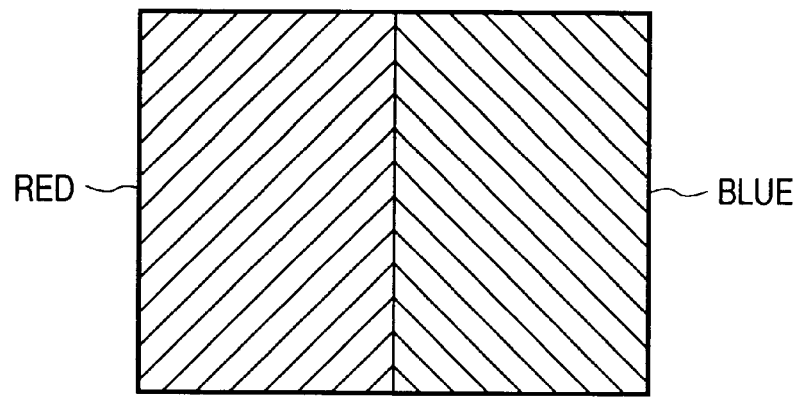
FIGS. 5A and 5B are views for explaining generation of jaggies.

FIG. 1 is a block diagram showing the arrangement of an image signal processing unit according to the embodiment of the present invention. A signal from an image sensing element 100 is adjusted in WB by a WB (White Balance) circuit 101, delayed by a delay circuit 130, and interpolated using signals of adjoining pixels in the vertical or horizontal direction by an adaptive luminance interpolation circuit 111. Details of the interpolation method will be described later. A determination signal from an interpolation direction detection circuit 112 serves as a control signal for a color conversion MTX (MaTriX) switching circuit 103.

A luminance signal undergoes edge enhancement (aperture circuit). The adaptively interpolated luminance signal passes through a horizontal bandpass filter 113, vertical bandpass filter 116, PP (aperture Peak) gain circuits 114 and 117, and BC (Base Clip) circuits 115 and 118. An adder 119 adds the high-frequency signals of the horizontal and vertical components and outputs the resultant signal to an APC (APerture Control) main gain circuit 120. An adder 121 adds an output signal from the APC main gain circuit 120 and the baseband signal of the luminance signal from the adaptive luminance interpolation circuit 111, and sends the resultant signal to a γ conversion circuit 122. A luminance correction (YCOMP) circuit 123 corrects the luminance of the γ-converted signal.

The signals interpolated by a color interpolation circuit 102 or the adaptive luminance interpolation circuit 111 is converted into R, G, and B signals by a color conversion MTX circuit 104 or 105. The color conversion MTX circuits 104 and 105 execute different matrix operations (as will be described later). An interpolation direction determination signal from the interpolation direction detection circuit 112 switches the color conversion MTX switching circuit 103 to select either of the color conversion MTX circuits 104 and 105. An output signal from the color conversion MTX circuit 104 or 105 is converted into a color difference signal. A CSUP (Chroma SUPress) circuit 106 suppresses the chroma gain in high and low luminance regions. A CLPF (Chroma Low-Pass Filter) circuit 107 limits the band of the signal and converts the signals into R, G, and B signals. A γ conversion circuit 108 γ-converts the R, G, and B signals. The γ-converted R, G, and B signals are converted into color difference signals again. A C gain knee (Chroma gain knee) circuit 109 adjusts the chroma gain of the color difference signals, and an LCMTX (Linear Clip MaTriX) circuit 110 corrects the hue. The resultant signals are output together with the luminance signal.

The adaptive interpolation method according to the embodiment in the image signal processing block having the above arrangement will be explained. According to the basic method, a green signal is adaptively interpolated, then red and blue signals are interpolated based on the green signal, and a luminance signal is generated. This method is executed by the adaptive luminance interpolation circuit 111. In this embodiment, interpolation is switched between the horizontal and vertical directions in accordance with the determination result of a vertical or horizontal stripe in interpolating a green signal. The method will be described with reference to the flow chart of FIG. 7.

Green signals are interpolated for all pixels other than green pixels, i.e., for red and blue pixels. To interpolate a green signal at a pixel P5 (P5(G)) in FIG. 2 (P1 to P9 represent pixel positions, and each character in parentheses represents a chroma signal obtained from the pixel and corresponds to the filter color), the absolute values of the differences between signals of upper and lower pixels of the pixel to be interpolated and between signals of right and left pixels of the pixel to be interpolated are calculated (correlation operation: step S1):

$$HDiff=|P4(G2)-P6(G2)|, VDiff=|P2(G1)-P8(G1)| \quad (6)$$

The difference between HDiff and VDiff is set as an interpolation direction determination signal MatSw:

$$MatSw=HDiff-VDiff \quad (7)$$

If the difference is negative, horizontal correlation is higher (step S2), and interpolation is performed using signals of adjoining pixels in the horizontal direction (step S4). If the difference is positive (step S2), interpolation is performed using signals of adjoining pixels in the vertical directions (step S3). All blue and red pixels are also interpolated by the same method.

Red signals are interpolated by using the interpolated green signals for all pixels except for red pixels. Green pixels are interpolated by using right and left or upper and lower red signals and the green signals of these red pixels, and blue pixels are interpolated by using four peripheral red pixels by $$P2(R)=((P1(R)-P1(G))+(P3(R)-P3(G)))/2+P2(G)$$

$$P4(R)=((P1(R)-P1(G))+(P7(R)-P7(G)))/2+P4(G)$$

$$P5(R)=((P1(R)-P1(G))+(P3(R)-P3(G))+(P7(R)-P7(G))+(P9(R)-P9(G)))/4+P5(G) \quad (8)$$

Blue signals can also be obtained by the same calculation. As a result, signals of three, R, G, and B colors can be attained for each pixel. Further, a luminance signal Y is calculated by $$Y=0.3 \times R+0.59 \times G+0.11 \times B \quad (9)$$

Note that the coefficients of the respective terms in equation (9) can be properly changed.

The color interpolation circuit 102 performs interpolation so as to give signals R, G1, G2, and B to all pixels (step S5).

As for interpolation of R and B signals, the interpolated R and B signals calculated by the adaptive luminance interpolation circuit 111 may be used.

The signals R, G1, G2, and B obtained by interpolation are input to the color conversion MTX circuit 104 or 105 via the MTX switching circuit 103 which is controlled by the interpolation direction detection circuit 112.

The interpolation direction detection circuit 112 determines vertical or horizontal interpolation on the basis of the interpolation direction determination signal MatSw obtained by the adaptive luminance interpolation circuit 111 (step S6). If vertical interpolation is determined, the interpolation direction detection circuit 112 controls the MTX switching circuit 103 to connect it to the color conversion MTX circuit 104 for suppressing a vertical false signal (step S7). If horizontal interpolation is determined, the interpolation direction detection circuit 112 controls the MTX switching circuit 103 to connect it to the color conversion MTX circuit 105 for suppressing a horizontal false signal (step S8).

The color conversion MTX circuits 104 and 105 will be described.

Figure 4:
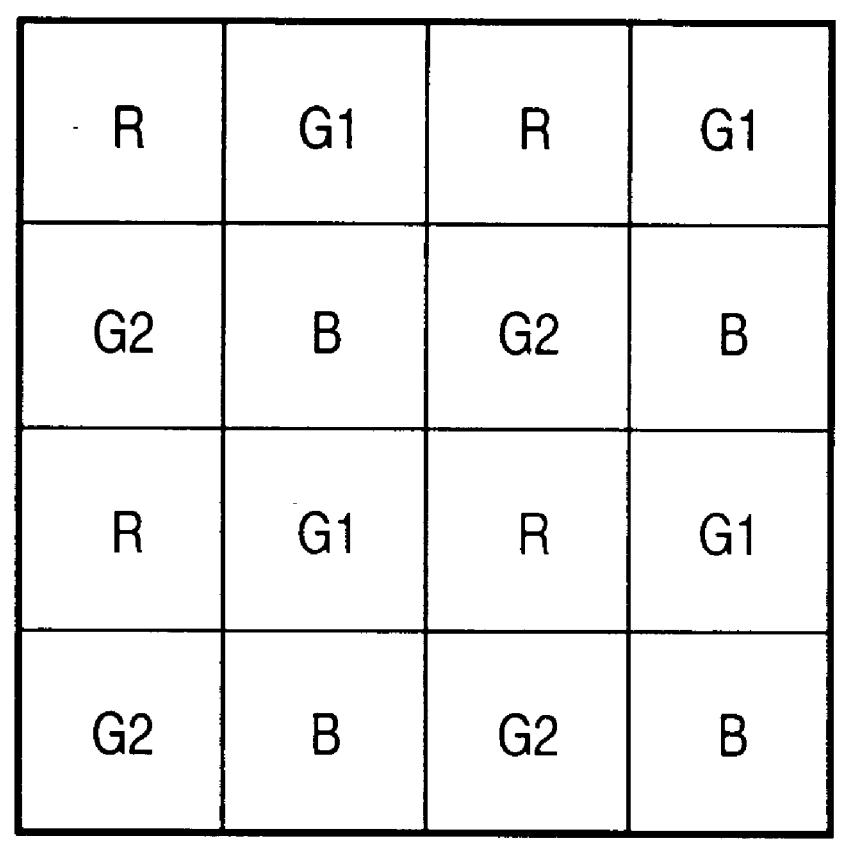

When the image sensing element 100 has filters of a primary color Bayer layout as shown in FIG. 4, the color conversion MTX circuit 104 computes $$\begin{bmatrix} R \\ G \\ B \end{bmatrix} = [a_{ij}] \begin{bmatrix} R(\lambda) \\ G1(\lambda) \\ G2(\lambda) \\ B(\lambda) \end{bmatrix} \quad (10)$$

where λ is the wavelength of light.

Figure 6B:
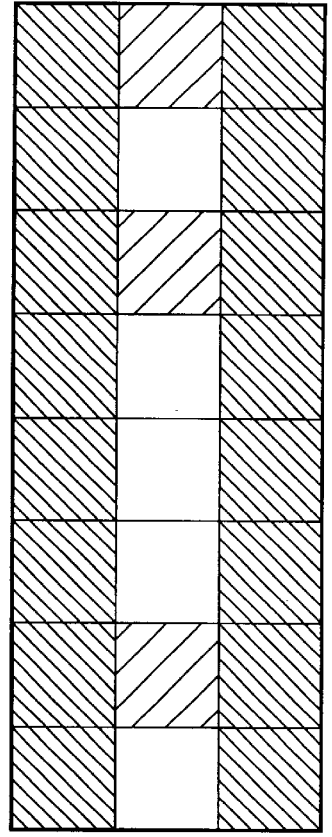
FIGS. 6A and 6B are views showing a pattern example suffering erroneous determination by adaptive interpolation.
Figure 6A:
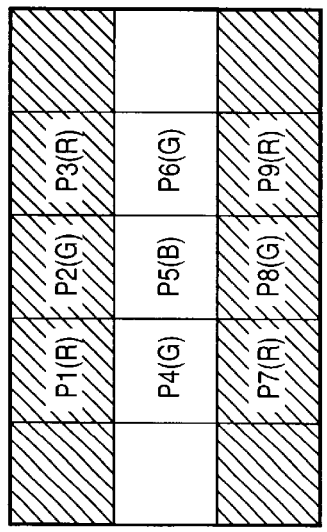

The coefficient $\{a_{ij}\}$ of the linear matrix in equation (10) must meet the following conditions. That is, when an image of an achromatic object is output via filters of a primary color Bayer layout as shown in FIG. 6A, output signals R(λ), G1(λ), G2(λ), and B(λ) corresponding to the respective filters are converted by the matrix $[a_{ij}]$ (i=3, j=4). The converted R, G, and B signals are $$R'(\lambda)=a11R(\lambda)+a12G1(\lambda)+a13G2(\lambda)+a14B(\lambda)$$

$$G'(\lambda)=a21R(\lambda)+a22G1(\lambda)+a23G2(\lambda)+a24B(\lambda) \quad B'(\lambda)=a31R(\lambda)+a32G1(\lambda)+a33G2(\lambda)+a34B(\lambda) \quad (11)$$

At this time, for example, the R and G1 filter positions shown in FIG. 2 are assumed to be in dark portions of an object to be sensed, and the G2 and B positions are assumed to be in bright portions of the object. Hence, any interpolation filters satisfy $$R(\lambda)=\alpha G1(\lambda)=V1(\lambda), B(\lambda)=\beta G2(\lambda)=V2(\lambda) \quad (12)$$

where α and β are parameters which depend on the color temperature of the object to be sensed.

From equations (11) and (12), $$R'(\lambda)=(a11+a12/\alpha)V1(\lambda)+(a13/\beta a14)V2(\lambda)$$

$$G'(\lambda)=(a21+a22/\alpha)V1(\lambda)+(a23/\beta a24)V2(\lambda)$$

$$B'(\lambda)=(a31+a32/\alpha)V1(\lambda)+(a33/\beta a34)V2(\lambda) \quad (13)$$

If R'(λ)=G'(λ)=B'(λ) does not hold in equation (13) in sensing an image of an achromatic object, a vertical false color is generated. To prevent this vertical false color, the following conditions must be satisfied:

$$a11+a12/\alpha=a21+a22/\alpha=a31+a32/\alpha a13/\beta+a14=a23/\beta+a24=a33/\beta+a34 \quad (14)$$

Since α and β change depending on the color temperature of the object to be sensed, α and β of an achromatic object are measured at a plurality of color temperatures in advance. If conversion is done by substituting G1'(λ) and G2'(λ) in equation (1) by the products obtained by multiplied the output G1(λ) by a and the output G2(λ) by β, equation (4) is rewritten as $$a11+a12=a21+a22=a31+a32 \quad a13+a14=a23+a24=a33+a34 \quad (15)$$

which are vertical false color suppression conditions. Coefficients which satisfy these conditions are obtained in advance and held in the color conversion MTX circuit 104.

On the other hand, the color conversion MTX circuit 105 can easily realize matrix operation which satisfies horizontal false color suppression conditions, by exchanging G1(λ) and G2(λ) in equation (10) in terms of the above description and the layout of respective color filters.

More specifically, using matrix coefficients which meet the conditions of equation (15), the color conversion MTX circuit 105 performs matrix operation:

$$\begin{bmatrix} R \\ G \\ B \end{bmatrix} = [a_{ij}] \begin{bmatrix} R(\lambda) \\ G2(\lambda) \\ G1(\lambda) \\ B(\lambda) \end{bmatrix} \quad (16)$$

Alternatively, different coefficients may be held without exchanging G1 and G2. In this case, for example, if the R and G2 filter positions shown in FIG. 2 are assumed to correspond to dark portions of an object to be sensed, and the G1 and B positions are assumed to correspond to bright portions of the object, then any interpolation filters satisfy $$R(\lambda)=\alpha G2(\lambda)=V1(\lambda), B(\lambda)=\beta G1(\lambda)=V2(\lambda) \quad (17)$$

Hence, by the same calculation as that described above, $$a11+a13=a21+a23=a31+a33 \; a12+a14=a22+a24=a32+a34 \quad (18)$$

can be defined as horizontal false color suppression conditions.

In this manner, the interpolation direction in adaptive interpolation is determined. Matrix operation is done by the color conversion MTX circuit 104 having matrix coefficients which meet vertical false color suppression conditions for a pixel interpolated in the vertical direction based on the determination signal. Matrix operation is done by the color conversion MTX circuit 105 having matrix coefficients which meet horizontal false color suppression conditions for a pixel interpolated in the horizontal direction. In other words, R, G, and B signals in the color processing system are generated by switching color conversion matrix operation so as to suppress a false color in a direction in which such false color is readily generated.

In a method of determining a vertical or horizontal stripe and adaptively switching interpolation between the vertical and horizontal directions, like the prior art, a color conversion matrix circuit to be used is switched based on an interpolation direction determining signal. Only this switching can easily reduce a false color particularly generated in a high-frequency image and form a higher-quality image.

The threshold is adjusted by introducing an offset value into the interpolation direction determination signal MatSw:

$$MatSw=HDiff-VDiff-Offset$$

Matrix switching between vertical and horizontal false color suppression conditions can be adjusted. The tendency of a false color to be appeared in the vertical and horizontal directions can be adjusted, so that the degree of the false color can be flexibly adjusted without decreasing the resolution even upon a change in the characteristics of an optical LPF.

As has been described above, according to this embodiment, a false color particularly generated in a high-frequency image can be easily reduced to form a higher-quality image using the method of determining a vertical or horizontal stripe and adaptively switching interpolation between the vertical and horizontal directions.

By adjusting the tendency of a false color to be appeared in the vertical and horizontal directions, the degree of the false color can be flexibly adjusted without decreasing the resolution upon a change in the characteristics of the optical LPF.

<Other Embodiment>

The present invention can be applied to a system constituted by a plurality of devices (e.g., host computer, interface, reader, camera head) or to an apparatus comprising a single device (e.g., copying machine, facsimile machine, digital camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Figure 7:
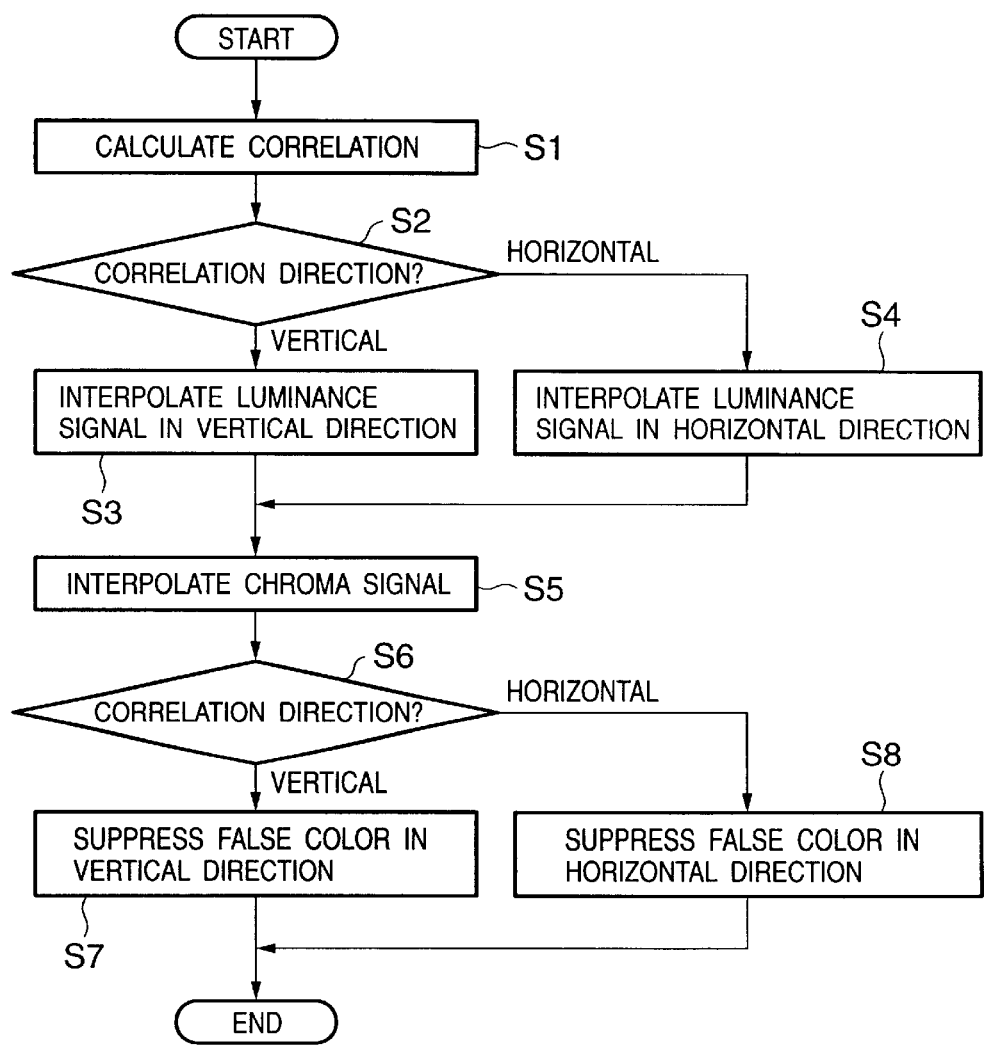
FIG. 7 is a flow chart showing adaptive interpolation processing procedures according to the embodiment of the present invention.
Figure 8:
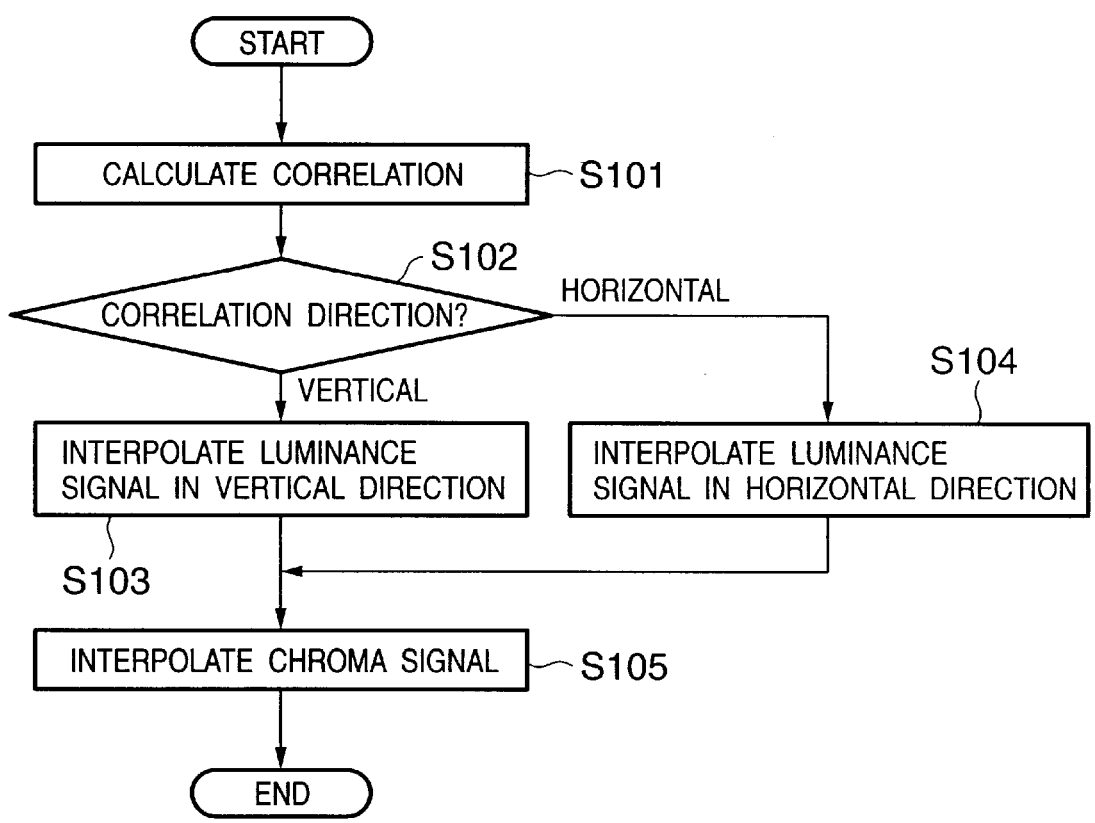
FIG. 8 is a flow chart showing conventional adaptive interpolation processing procedures.

In a case where the present invention is applied to the aforesaid storage medium, the storage medium stores program codes corresponding to the flowchart in FIG. 7 described in the embodiment.

The present invention is not limited to the above embodiments and various changes and modifications can be made within the spirit and scope of the present invention. Therefore to apprise the public of the scope of the present invention, the following claims are made.

What is claimed is:

1. A signal processing apparatus for acquiring an image signal from an image sensing element having color filters and processing the image signal, comprising:

correlation operation means for determining correlation of the image signal in vertical and horizontal directions;

first interpolation means for interpolating a chroma signal of the image signal;

first signal processing means for performing signal processing of suppressing a false color in the vertical direction using a first matrix operation;

second signal processing means for performing signal processing of suppressing a false color in the horizontal direction using a second matrix operation; and selection means for selecting said first or second signal processing means on the basis of the correlation obtained by said correlation operation means, wherein the chroma signal interpolated by said first interpolation means is processed by said first or second signal processing means selected by said selection means.

2. The apparatus according to claim 1, wherein said first interpolation means performs interpolation so as to give each pixel first to fourth chroma signals x1 to x4, said first signal processing means performs matrix operation:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x2 \\ x3 \\ x4 \end{bmatrix}$$

said second signal processing means performs matrix operation:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x3 \\ x2 \\ x4 \end{bmatrix}$$

and matrix coefficients satisfy conditions:

$a11+a12=a21+a22=a31+a32$ $a13+a14=a23+a24=a33+a34$.

3. The apparatus according to claim 1, wherein said first interpolation means performs interpolation so as to give each pixel first to fourth chroma signals x1 to x4, said first and second signal processing means perform matrix operation:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x2 \\ x3 \\ x4 \end{bmatrix}$$

said first signal processing means performs operation by using coefficients which satisfy conditions:

$a11+a12=a21+a22=a31+a32$ $a13+a14=a23+a24=a33+a34$ and said second signal processing means performs operation by using coefficients which satisfy conditions:

$a11+a13=a21+a23=a31+a33$ $a12+a14=a22+a24=a32+a34$.

4. The apparatus according to claim 1, wherein when said correlation operation means determines that the correlation in the vertical direction is higher, said selection means selects said first signal processing means, and when said correlation operation means determines that the correlation in the horizontal direction is higher, said selection means selects said second signal processing means.

5. The apparatus according to claim 1, wherein the color filters include filters of a Bayer layout, and said correlation operation means comprises vertical correlation operation means for calculating an absolute value of a difference between signal values of upper and lower pixels for each pixel corresponding to a filter other than a green filter, horizontal correlation operation means for calculating an absolute value of a difference between signal values of right and left pixels for each pixel corresponding to the filter other than a green filter, and correlation determination means for comparing the absolute values calculated by said vertical and horizontal correlation operation means, and determining the correlation.

6. The apparatus according to claim 5, wherein said correlation determination means subtracts the absolute value calculated by said vertical correlation operation means from the absolute value calculated by said horizontal correlation operation means, when an obtained difference is negative, determines that the correlation in the horizontal direction is higher, and when the obtained difference is positive, determines that the correlation in the vertical direction is higher.

7. The apparatus according to claim 1 further comprising second interpolation means for interpolating a luminance signal of the image signal in a direction in which the correlation obtained by said correlation operation means is higher, wherein the color filters include filters of a Bayer layout, and said second interpolation means comprises G interpolation means for interpolating a green signal in a direction in which the correlation is higher, color difference signal generation means for obtaining a color difference between red and blue signals and a corresponding interpolated green signal, RB interpolation means for interpolating the red and blue signals on the basis of the green signal and the color difference obtained by said color difference signal generation means, and luminance signal interpolation means for generating a luminance signal from the image signal obtained by the image sensing element, and the green, red, and blue signals obtained by said G and RB interpolation means.

8. The apparatus according to claim 5, wherein said correlation determination means subtracts a predetermined constant and the absolute value calculated by said vertical correlation operation means from the absolute value calculated by said horizontal correlation operation means, when an obtained value is negative, determines that the correlation in the horizontal direction is higher, and when the obtained value is positive, determines that the correlation in the vertical direction is higher.

9. A signal processing method of acquiring an image signal from an image sensing element having color filters and processing the image signal, comprising:

a correlation operation step of determining correlation of the image signal in vertical and horizontal directions;

a first interpolation step of interpolating a chroma signal of the image signal;

a selection step of selecting either of the vertical and horizontal directions on the basis of the correlation obtained in said correlation operation step; and a signal processing step of performing signal processing of suppressing a false color in the vertical or horizontal direction selected in said selection step for the chroma signal interpolated in the first interpolation step by performing matrix operation.

10. The method according to claim 9, wherein interpolation is performed in said first interpolation step so as to give each pixel first to fourth chroma signals x1 to x4, when the vertical direction is selected in said selection step, matrix operation is performed in said signal processing step:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x2 \\ x3 \\ x4 \end{bmatrix}$$

when the horizontal direction is selected in said selection step, matrix operation is performed in the signal processing step:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x3 \\ x2 \\ x4 \end{bmatrix}$$

and
matrix coefficients satisfy conditions:

$a11+a12=a21+a22=a31+a32$  $a13+a14=a23+a24=a33+a34$.

11. The method according to claim 9, wherein
interpolation is performed in said first interpolation step so as to give each pixel first to fourth chroma signals x1 to x4,
matrix operation is performed in the signal processing step:

$$\begin{bmatrix} y1 \\ y2 \\ y3 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} x1 \\ x2 \\ x3 \\ x4 \end{bmatrix}$$

when the vertical direction is selected in said selection step, operation is performed in the signal processing step by using coefficients which satisfy conditions:

$a11+a12=a21+a22=a31+a32$  $a13+a14=a23+a24=a33+a34$ and
when the horizontal direction is selected in said selection step, operation is performed in the signal processing step by using coefficients which satisfy conditions:

$a11+a13=a21+a23=a31+a33$  $a12+a14=a22+a24=a32+a34$.

12. The method according to claim 9, wherein when the correlation in the vertical direction is determined to be higher in said correlation operation step, the vertical direction is selected in said selection step, and when the correlation in the horizontal direction is determined to be higher in said correlation operation step, the horizontal direction is selected in said selection step.

13. The method according to claim 9, wherein
the color filters include filters of a Bayer layout, and
said correlation operation step comprises
a vertical correlation operation step of calculating an absolute value of a difference between signal values of upper and lower pixels for each pixel corresponding to a filter other than a green filter,
a horizontal correlation operation step of calculating an absolute value of a difference between signal values of right and left pixels for each pixel corresponding to the filter other than a green filter, and a correlation determination step of comparing the absolute values calculated in said vertical and horizontal correlation operation steps, and determining the correlation.

14. The method according to claim 13, wherein in the correlation determination step, the absolute value calculated in said vertical correlation operation step is subtracted from the absolute value calculated in said horizontal correlation operation step, when an obtained difference is negative, the correlation in the horizontal direction is determined to be higher, and when the obtained difference is positive, the correlation in the vertical direction is determined to be higher.

15. The method according to claim 9 further comprising a second interpolation step of interpolating a luminance signal of the image signal in a direction in which the correlation obtained in said correlation operation step is higher;
wherein the color filters include filters of a Bayer layout, and
said second interpolation step comprises
a G interpolation step of interpolating a green signal in a direction in which the correlation is higher,
a color difference signal generation step of obtaining a color difference between red and blue signals and a corresponding interpolated green signal,
an RB interpolation step of interpolating the red and blue signals on the basis of the green signal and the color difference obtained in said color difference signal generation step, and
a luminance signal interpolation step of generating a luminance signal from the image signal obtained by the image sensing element, and the green, red, and blue signals obtained in said G and RB interpolation steps.

16. The method according to claim 13, wherein in said correlation determination step, a predetermined constant and the absolute value calculated in said vertical correlation operation step are subtracted from the absolute value calculated in said horizontal correlation operation step, when an obtained value is negative, the correlation in the horizontal direction is determined to be higher, and when the obtained value is positive, the correlation in the vertical direction is determined to be higher.

17. A computer program product comprising a computer usable medium having computer readable program code means embodied in said medium for acquiring an image signal from an image sensing element having color filters and processing the image signal, said product including:
first computer readable program code means for determining correlation of the image signal in vertical and horizontal directions;
second computer readable program code means for interpolating a chroma signal of the image signal;
third computer readable program code means for performing signal processing of suppressing a false color in the vertical direction using a first matrix operation;
fourth computer readable program code means for performing signal processing of suppressing a false color in the horizontal direction using a second matrix operation; and
fifth computer readable program code means for selecting said third or fourth computer readable program code means on the basis of the obtained correlation,
wherein the interpolated chroma signal is processed by the selected third or fourth computer readable program code means.

* * * * *